United States Patent [19]

Hongel

[11] Patent Number: 4,959,746

[45] Date of Patent: Sep. 25, 1990

[54] RELAY CONTACT PROTECTIVE CIRCUIT

[75] Inventor: Chester C. Hongel, Brush Prairie, Wash.

[73] Assignee: Electronic Specialty Corporation, Vancouver, Wash.

[21] Appl. No.: 237,547

[22] Filed: Aug. 29, 1988

Related U.S. Application Data

[63] Continuation-in-part of Ser. No. 9,236, Jan. 30, 1987.

[51] Int. Cl.[5] .......... H02H 7/22

[52] U.S. Cl. .......... 361/13; 361/8; 361/187; 361/198

[58] Field of Search .......... 361/5, 6, 13, 58, 91, 361/110, 111, 115, 160, 170, 187, 195, 196, 197, 198; 263/15, 16, 17, 24, 25

[56] References Cited

U.S. PATENT DOCUMENTS

| | | | |
|---|---|---|---|
| 3,639,808 | 2/1972 | Ritzow | 361/13 |
| 4,389,691 | 6/1983 | Hancock | 361/13 X |
| 4,420,784 | 12/1983 | Chen et al. | 361/13 X |
| 4,525,762 | 6/1985 | Norris | 361/13 |
| 4,658,320 | 4/1987 | Hongel | 361/58 |
| 4,723,187 | 2/1988 | Howell | 361/5 X |
| 4,760,483 | 7/1988 | Kugelman et al. | 361/13 |

*Primary Examiner*—Derek S. Jennings

*Attorney, Agent, or Firm*—Dellett, Smith-Hill and Bedell

[57] ABSTRACT

A contact protective circuit for a relay detects a transient in the relay operating coil and turns on a low resistance power MOSFET in shunt relation with the contacts before the contacts close or open whereby arcing or deposition of metal on the contracts is avoided. Timing circuitry is provided for controlling the MOSFET to conduct large direct currents for short periods of time. In one embodiment, a ramp up circuit responds to a voltage level in a control signal to drive the operating coil and power a DC-to-DC converter and a timing circuit. The invention provides for hot side switching as well as cold side switching of a load.

29 Claims, 5 Drawing Sheets

RELAY CONTACT PROTECTIVE CIRCUIT

BACKGROUND OF THE INVENTION

This application is a continuation-in-part of my co-pending application Ser. No. 009,236, filed Jan. 30, 1987 for RELAY CONTACT PROTECTIVE CIRCUIT.

The present invention relates to a relay contact protective circuit and particularly to such a circuit for protecting relay contacts carrying high values of direct current.

There is a significant need for controlling direct currents with a physically small switching device, such as a relay. The problem involved in satisfying this need, however, is that as the contacts of the relay are opened or closed, an electrical discharge can cause heating and burning of the electrodes, leading to welding and destruction thereof.

A number of prior circuits provide some kind of shunting means across the relay contacts for temporarily diverting current flow and thereby avoiding contact arcing. For example, the voltage may be monitored across the relay contacts, and when this voltage reaches a predetermined value a shunting device is gated into operation. One such circuit is disclosed in U.S. Pat. No. 4,438,472 to Woodworth. A drawback associated with the Woodworth suppression circuit relates to the relatively high active state collector-to-emitter impedance of the bipolar transistor utilized. During arc suppression, the current shunted through the high impedance path generates heat which can cause equipment failure, particularly when the contacts are opened and closed frequently. Therefore, the circuit is limited to low current switching applications. Moreover, the contacts are subject to some arcing inasmuch as it is the voltage across the contacts which is detected for energizing the shunting transistor. Furthermore, the Woodworth circuit is limited to direct current operation and requires a comparatively large biasing capacitor.

In applicant's co-pending application Ser. No. 709,930 filed Mar. 8, 1985, now U.S. Pat. No. 4,658,320 issued Apr. 14, 1987, an arc suppressor is set forth which overcomes some of the disadvantages of the Woodworth circuit inasmuch as a field effect transistor is employed requiring a smaller biasing capacitor. Moreover, this circuit is suitable for use in conjunction with alternating current applications. However, its utility is limited in connection with high direct current circuits inasmuch as small voltages may still appear across the contacts as the contacts open and close, resulting in pitting of one contact and deposition of material on the other.

For the complete protection of relay contacts it is desired to avoid altogether the making or breaking of a current path via the contacts. One proposal for the possible detection of contact opening and closure, prior to the actual change in the circuit-completing status of the contacts, is set forth in Ritzow U.S. Pat. No. 3,639,808. An extra winding on the relay operating coil, or a transformer connected thereto, triggers a thyristor or triac disposed in shunting relation to the relay contacts. The shunting effect is retained only until an alternating current source reverses whereby conduction through the triac or thyristor is terminated. Thus, this circuit is suitable only for alternating current applications. Also, shunting circuits can be affected by the rise time of the coil drive.

Moreover, the prior art devices, even though providing shunting with respect to relay contacts, did not reduce the voltage across the contacts sufficiently, under high DC load current conditions, to avoid metal deposition and pitting as the contacts open, close or bounce.

SUMMARY OF THE INVENTION

In accordance with the present invention, in a particular embodiment thereof, a contact protective circuit for a relay comprises means for detecting a transient in the relay operating coil, and a low "on" resistance, metal oxide semiconductor field effect transistor having its drain-source circuit connected across the relay contacts for shunting the contacts when the transient occurs. A timing means, responsive to the transient detection and coupled to the gate terminal of the field effect transistor, gates the field effect transistor to an on condition, diverting current around the said contacts at least as soon as the contacts begin to open or close. The timing means preferably comprises a monostable multivibrator sustaining conduction through the field effect transistor until the contacts are completely opened or completely closed including relay bounce time. The on-resistance of the power MOSFET preferably employed is so low that the voltage across the relay contacts during switching is never high enough to result in pitting or metal deposition as a result of direct current flow, even when the currents are very high, e.g., on the order of tens or hundreds of amperes.

In order to accommodate very large direct currents, power MOSFETs are employed having very low Rds On resistance, on the order of less than 0.5 volts divided by the DC current expected to flow between the relay contacts. It is found that if the voltage across the contacts is less than 0.5 volts, no metal transfer takes place. This metal transfer, which takes place below 12 volts and above 0.5 volts in the case of silver or gold contacts, causes pitting of the positive contact and material build up on the negative contact, eventually resulting in sticking or welding.

In accordance with an embodiment of the present invention, the timing means responsive to a positive transient detection comprises a first monostable multivibrator adapted to bring about conduction of the power MOSFET as the relay contacts close (e.g., before the contacts move and during transit), and a second monostable multivibrator, responsive to a negative transient, for turning on the same MOSFET as the relay contacts open. The period during which the respective monostable multivibrators remain in their unstable condition is adjusted to span the closing and opening times, respectively, of the particular relay contacts.

In another embodiment of the present invention, suitable for double throw relay contacts, a first monostable multivibrator causes a first power MOSFET to shunt breaking relay contacts, while a second monostable multivibrator, cascaded with the first, operates a second MOSFET to shunt making contacts after a predetermined time delay. For the reverse operation, another monostable multivibrator detects a negative transient for operating the second field effect transistor for shunting breaking contacts, while a fourth monostable multivibrator, triggered by the last mentioned monostable stable multivibrator, enables the first field effect transistor to shunt the making contacts after a predetermined time delay.

The transient detecting means may comprise a winding inductively related to the operating coil of the relay. However, a transformer interconnected with the operating coil may also be used.

In yet another embodiment of the present invention, a ramp-up circuit responds to a voltage level in the relay control input and drives the relay operating coil while concurrently triggering a timing means for shunting current around the contacts during a change in the status of the contacts. The control input can also power arc suppression circuitry such that a separate power supply is not required.

It is accordingly an object of the present invention to provide an improved relay contact protective circuit operative for preventing pitting or metal deposition on contacts adapted to carry large values of direct current.

It is another object of the present invention to provide an improved relay contact protective circuit adapted for substantially eliminating damaging voltages across making or breaking relay contacts in direct current circuits.

Another object of the present invention is to provide an improved arcless relay triggerable by a comparatively slowly rising ramp waveform.

A further object of the present invention is to provide an improved arcless relay powered by the input or control signal.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

.DRAWINGS

FIG. 1 is a schematic and block diagram of a first embodiment according to the present invention, FIG. 2A and FIG. 2B are schematic and block diagrams illustrating a second embodiment of the second invention, FIG. 3 is a waveform chart descriptive of the operation of the circuitry of FIGS. 2A and 2B, FIG. 4 is a schematic and block diagram of a third embodiment of the present invention, and FIG. 5 is a schematic and block diagram of a fourth embodiment of the present invention.

DETAILED DESCRIPTION

Figure 1:
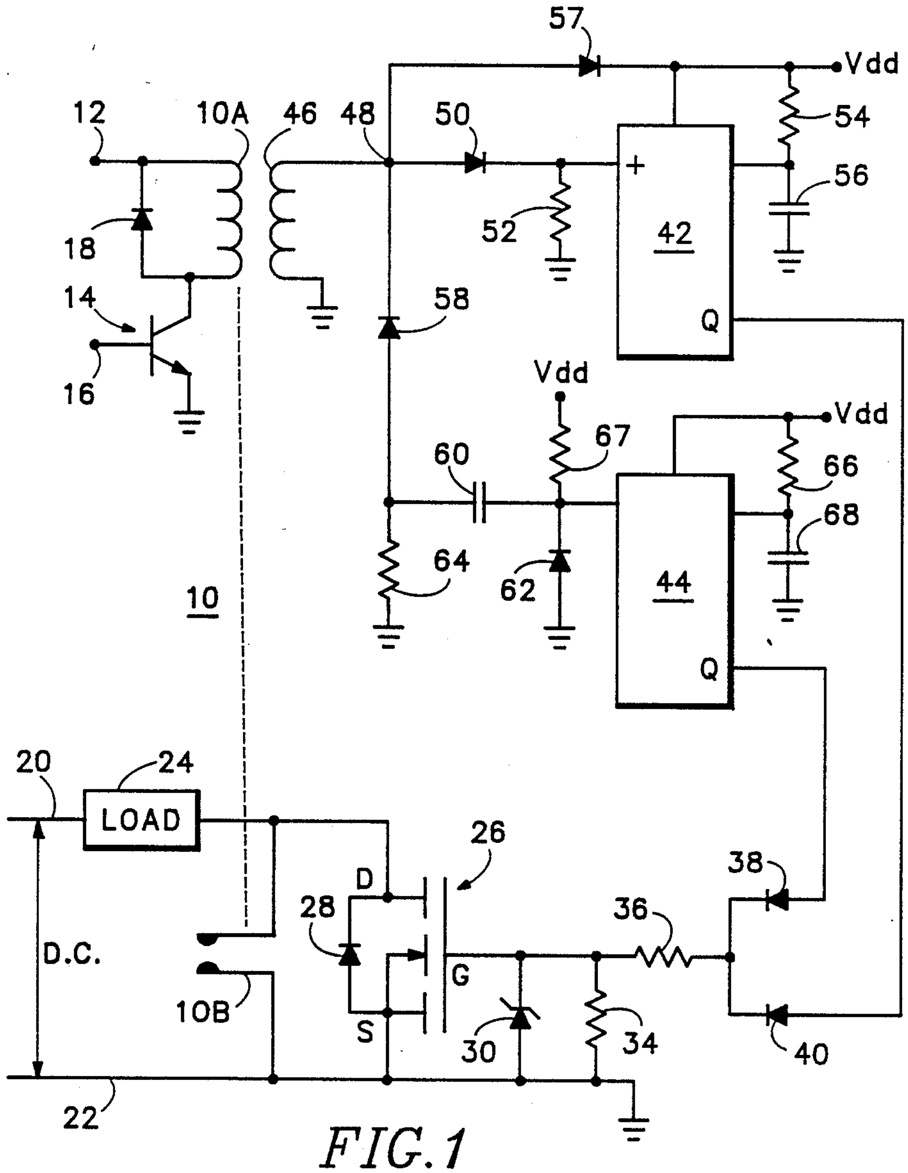

Referring to the drawings and particularly to FIG. 1, a relay 10 includes an operating coil 10A and normally open contacts 10B. A source of DC power is connected to terminal 12 at one end of the operating coil, while a control transistor 14 has its collector coupled to the remaining coil lead and its emitter grounded. A control signal applied to transistor base terminal 16 causes the circuit to be completed through operating coil 10A and transistor 14 for the purpose of closing the contacts 10B. A protective diode 18 is shunted across the operating coil 10A to absorb damaging transients as may occur when the current through the coil is terminated.

Contacts 10B complete a circuit between a source of DC power, applied between lines 20 and 22, and a load 24. The DC current flowing through the load is typically on the order of from 10 to 50 amperes when the contacts are closed.

Contacts 10B are shunted by a very low on resistance, power MOSFET (metal oxide semiconductor field effect transistor) 26. The field effect transistor preferred in particular is an enhancement mode, n-channel, silicon-gate, TMOS power MOSFET or multiple DMOS power MOSFET. Examples of suitable MOSFETs are types 45N06 and 60N06 or other multiple short channel devices. The MOSFET is adapted to provide an Rds On resistance of less than 0.5 volts divided by the DC current which flows through the load so that the voltage appearing across contacts 10B is less than 0.5 volts whereby to avoid pitting or metal deposition on the contacts and resultant mechanical failure. In the case of extremely high currents, more than one MOSFET 26 may be connected in parallel relation.

The MOSFET 26 includes drain, source and gate terminals, labelled D, S and G respectively, and an internal pn junction 28 between the D and S terminals as shown. The S terminal is returned to ground in common with DC line 22, while the D terminal is connected to the junction between contacts 10B and load 24. The order of load, contacts and ground may, of course, be changed, but the MOSFET 26 is in any case disposed in shunting relation to contacts 10B.

Gate terminal G of the MOSFET is shunted to ground by zener diode 30 for limiting the gate voltage with respect to ground. Zener diode 30 is disposed across an input resistance 34. The gate terminal G is further connected by way of coupling resistor 36 to the cathodes of gating diodes 38 and 40 which provide positive-going pulses from timing means here comprising monostable multivibrators 42 and 44, respectively, for turning on MOSFET 26 at predetermined times and thereby shunting the relay contacts.

The operating coil transient occurring when power is applied to operating coil 10A is detected in the FIG. 1 embodiment by means of a winding 46 inductively related to coil 10A. Winding 46, which may be wound over the operating coil, has one end grounded and the remaining lead connected to common terminal 48. A first diode 50 couples terminal 48 to a first input of monostable multivibrator 42, the latter forming a first pulse forming circuit of timing means according to the preferred embodiment of the present invention. The anode of diode 50 is connected to terminal 48, while the cathode thereof is connected to the input terminal of multivibrator 42 for triggering the multivibrator from its stable state to its unstable state upon receipt of a positive going transition. The multivibrator input terminal is returned to ground via input resistor 52.

A timing circuit, comprising resistor 54 and capacitor 56 in series between positive supply voltage Vdd and ground, determines the "on-time", that is the length of the unstable period, for the multivibrator. The junction between resistor 54 and capacitor 56 is connected to the appropriate timing input terminal of the multivibrator. A limiting diode 57 is interposed between terminal 48 and the positive supply voltage to prevent damage to the circuit as a result of a high voltage input transient exceeding the supply voltage by more than a diode drop. The "Q" output of multivibrator 42 is coupled to the anode of the aforementioned gating diode 40.

When a positive going transient appears at terminal 48 as a result of power being applied to relay operating coil 10A, multivibrator 42 immediately turns on by switching from its stable state to its unstable state. This substantially precedes the actual change in the circuit-completing contacts 10B (closing in this case). The Q output of multivibrator 42 is coupled to field effect transistor 26 and the field effect transistor turns on to provide shunting of the contacts 10B before they close. The time constant of the resistor 54-capacitor 56 combination is set so as to retain the multivibrator 42 in its unstable condition until the contacts 10B are completely closed, allowing time for contact bounce. Therefore, the contacts 10B will be completely closed before they are required to carry substantial current.

A second timing circuit portion according to the preferred embodiment includes a diode 58 coupling terminal 48 to a triggering input of multivibrator 44 by way of capacitor 60. A diode 2 returns the multivibrator input to ground for protecting the circuit against negative transient spikes exceeding the drop of the diode 62. A resistor 64 at the input side of capacitor 60 couples the anode of diode 58 to ground, while a resistor 67 on the output side of the capacitor returns the cathode of diode 62 to .Vdd whereby the input and output of the capacitor may reside at different voltage levels.

When a negative going spike appears across winding 46, indicating the discontinuance of power to coil 10A as by the cessation of conduction through transistor 14, the negative going transient returns the trigger input of multivibrator 44 to ground from Vdd by means of charged capacitor 60 for initiating the unstable period of the multivibrator. As soon as the power to the relay coil is interrupted, multivibrator 44 substantially immediately fires and produces a positive going "Q" output coupled to the gate of field effect transistor 26 through diode 38. The field effect transistor 26 shunts contacts 10B before those contacts actually start to physically open. The time constant of the resistor 66-capacitor 68 circuit coupled to multivibrator 44 is chosen so that field effect transistor 26 continues to conduct until contacts 10B have entirely separated and there is no possibility of arcing.

It will thus be seen the contacts 10B are entirely protected from carrying any substantial DC load current at any time during the opening and closure thereof and the voltage between the contacts upon opening or closure is less than would result in metal transfer. It is seen that this circuit does not require any voltage across the relay contacts in order to supply the turn on signal for the field effect transistor. Although the field effect transistor 26 conducts substantial current during the opening and closing intervals of the contacts, nevertheless the period during which the field effect transistor conducts is extremely short. The field effect transistor carries the load during switching of the relay contacts typically for not more than 10 milliseconds. This represents an extremely low duty cycle under normal relay operating conditions, even under typical relay life test cycling, i.e., 10 milliseconds out of three seconds (representing a 0.3% duty cycle).

The monostable multivibrators 42 and 44 are suitably provided on one 4538 IC and are preferred for accurate timing. However, other timing means, such as RC timing circuits, may be substituted therefor. The voltage for the circuit, designated Vdd, is desirably provided by a DC to DC converter including an isolating transformer for isolating the control circuitry from a common DC source as may be provided to energize the load.

Figure 2A:
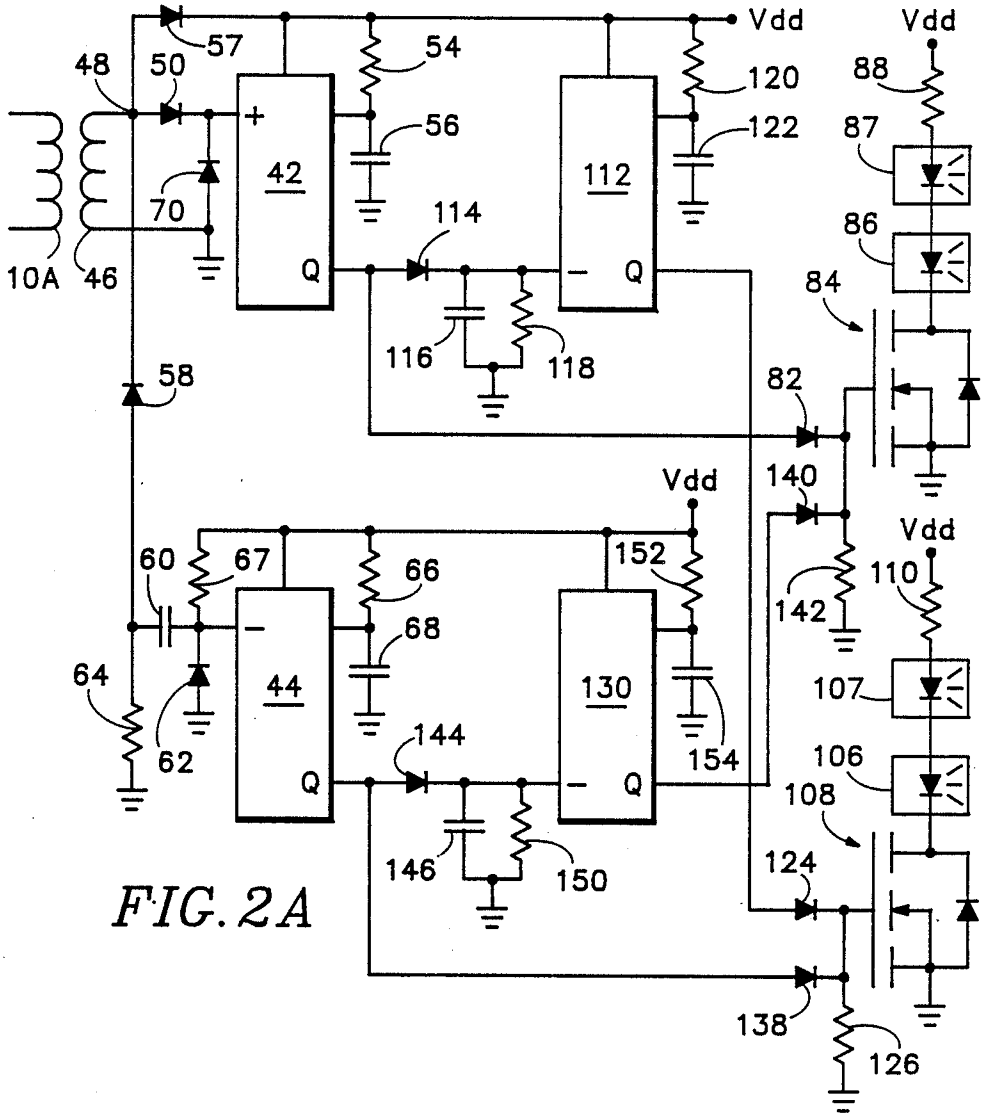
Figure 2B:
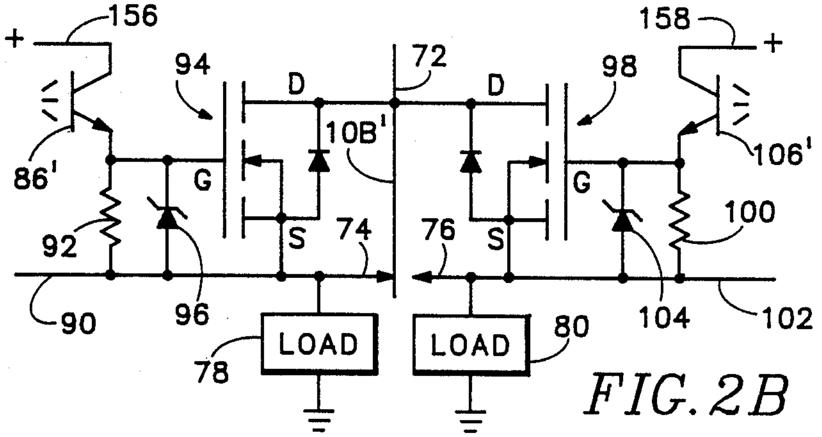

Referring to FIGS. 2A and 2B, a second embodiment of the present invention is illustrated which is appropriate for protecting double throw contacts of a relay having an operating coil 10A and a main contact 10B′ connected via lead 72 to a source of DC power. Contact 10B′ is normally closed against contact 74 whereby source conductor 72 supplies power to load 78. When operating coil 10A is actuated, the contact 10B′ closes against contact 76 and DC power is supplied to load 80.

As in the previous embodiment, the timing means for operating relay shunting circuitry suitably includes a monostable multivibrator 42 operated in response to a positive going transient induced in winding 46, and a monostable multivibrator 44 operated in response to a negative going transient induced in winding 46. Multivibrator 42 is switched from its stable state to its unstable state when operating coil 10A is energized, while monostable multivibrator 44 is operated from its stable state to its unstable state when operating coil 10A is deenergized. In the present embodiment, operating coil 10A is energized for separating the contacts 10B′ and 74, and upon being so energized, monostable multivibrator 42 switches, providing a Q output coupled through diode 82 to the gate terminal of a first MOSFET 84, having light emitting portions 86 and 87 of opto couplers connected in series between the drain of the MOSFET and a load resistor 88 returned to Vdd. Light receiving portion 86′ of an opto coupler 86-86′ in FIG. 2B thereupon completes a circuit between a positive voltage 156 and a common return 90, developing a voltage across resistor 92 which is applied to the gate electrode G of low resistance, power MOSFET 94. Consequently, MOSFET 94 is switched to an on condition before contacts 10B′ and 74 actually separate, even considering the delay through MOSFET 84. The time constant of the resistor 54-capacitor 56 combination is sufficient to maintain monostable multivibrator 42 in an on condition until the contacts 10B′ and 74 have completely separated. Protective zener diode 96 protects gate G of MOSFET 94 from transients. Resistor 142 returns the gate of field effect transistor 84 to ground. MOSFETs 94 and 98 are similar to MOSFET 26 of FIG. 1.

Contacts 10B′ and 76 are shunted by means of second low resistance power MOSFET 98 having its gate terminal G connected to a resistor 100 which is returned to common lead 102 and shunted by protective zener diode 104. The light receiving portion 106′ of an opto coupler receives light from a light emitting portion 106 thereof connected in series with another opto coupler light emitting portion 107 and MOSFET 108 disposed between load resistor 110 and ground, wherein the load resistor is connected to Vdd. MOSFET 108 is turned on, so as to bring about the light emitting condition of portion 106, when a Q output is produced by monostable multivibrator 112, the latter suitably forming an additional part of the timing circuitry.

Monostable multivibrator 112 receives the Q output of monostable multivibrator 42 by way of diode 114 having its anode connected to the negative input of the monostable multivibrator 112 and being shunted to ground by the parallel combination of capacitor 116 and resistor 118. A timing circuit for controlling the on time, i.e., the unstable period, of monostable multivibrator 112 comprises the serial combination of resistor 120 and capacitor 122 interposed between Vdd and ground, where the tap therebetween is coupled to the appropriate timing terminal of multivibrator 112. The Q output of monostable multivibrator 112 is connected to the gate of MOSFET 108 via diode 124. The cathode of diode 124 is connected to the aforementioned gate terminal while also being returned to ground through resistor 126.

The parallel combination of capacitor 116 and resistor 118 at the input of multivibrator 112 comprises a timing circuit adapting multivibrator 112 to switch to its unstable state a short predetermined period after the conclusion of the Q output of multivibrator 42. Then, multivibrator 112 remains in its unstable state for a period of time determined by the resistor 120-capacitor 122 circuit.

Thus, after contacts 10B′ and 74 in FIG. 2B have opened and contact 10B′ has almost closed against contact 76, monostable multivibrator 112 is turned on causing turn-on of MOSFET 108 as well as light emitting portion 106 of the opto coupler. Receiving portion 106′ of the same opto coupler is effective in turning on low resistance power MOSFET 98 for shunting contacts 10B′ and 76 before physical closure thereof. The multivibrator 112 remains in its unstable condition for a sufficient period to continue the shunting of contacts 10B′ and 76 until they are completely closed and any contact bounce has concluded. Therefore, any arcing or material deposition between contacts 10B′ and 76 is avoided as a result of the low resistance shunting.

Figure 3:
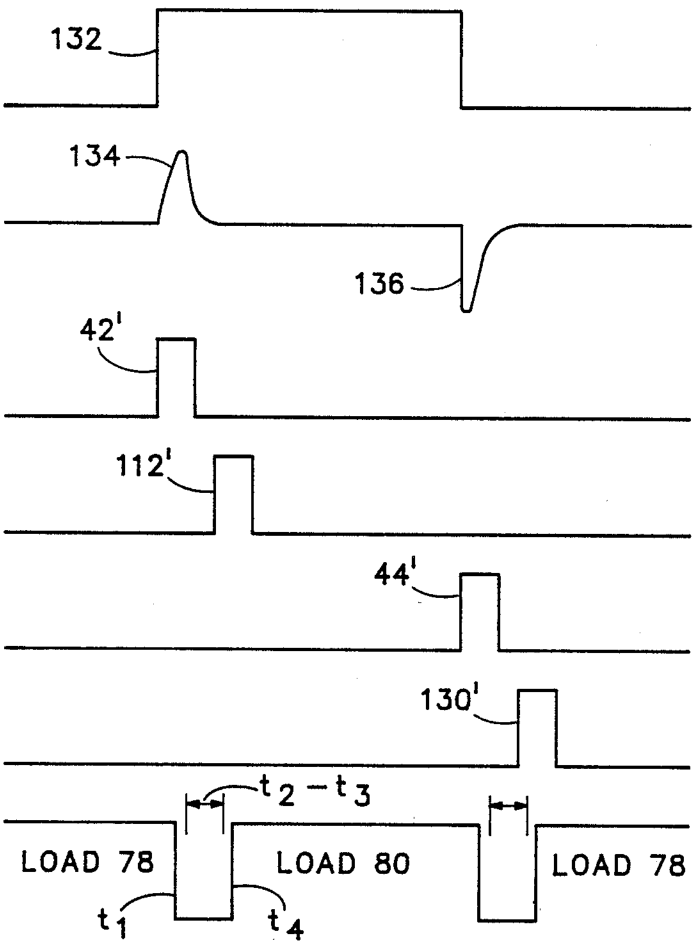

The operation of the circuit as thus far described is more fully illustrated by the waveform chart of FIG. 3 wherein waveform 132 represents the voltage applied to coil 10A, and waveform portions 134 and 136 respectively represent the positive and negative secondary transients detected via winding 46. Waveform 42′ represents the Q output of monostable multivibrator 42 while waveform 112′ corresponds to the Q output of multivibrator 112. Referring to the bottom characterization of FIG. 3, representing relay switching positions, load 78 is energized until time t1 via relay contacts 10B′ and 74, at which time the contacts begin to open. The transit time of movable contact 10B′ is represented by time interval t2–t3 in the drawing. Contact 10B′ is closed against contact 76 at time t4 whereby the circuit is completed through the relay contacts to load 80. It will be seen the on time 42′ of multivibrator 42, causing the shunting operation of MOSFET 94, spans the separating time of contacts 10B′ and 74, while the on time 112′ of multivibrator 112 spans the closing period of contacts 10B′ and 76.

Returning to FIGS. 2A and 2B, when the relay coil 10A is subsequently de-energized for the return of contact 10B′ to its original position against contact 74, multivibrator 44 will first be turned on providing a Q output through diode 138 to the gate of MOSFET 108. The light emitting opto coupler portion 106 again causes conduction through light receiving portion 106′, and accordingly low resistance power MOSFET 98 is energized for shunting contacts 10B′ and 76 as they open.

MOSFET 84 then receives a second input through diode 140 having its anode coupled to the Q output of a timing circuit portion here comprising monostable multivibrator 130, and having its cathode connected to the gate of MOSFET 84. Monostable multivibrator 130 is triggered at its negative terminal from the concluding Q output of multivibrator 44 through diode 144, the cathode of which is connected to the input of multivibrator 130 and returned to ground via the parallel combination of capacitor 146 and resistor 150. A timing circuit for the "on-time" of multivibrator 130 comprises resistor 152 in series with capacitor 154 disposed between Vdd and ground, wherein the interconnection therebetween is coupled to the timing terminal of the multivibrator.

At a predetermined time after operation of multivibrator 44, as determined by the time constant of circuit 146–150, multivibrator 130 turns on and provides its Q output by way of diode 140 to MOSFET 84. The unstable period of multivibrator 130 starts at a predetermined time after the Q output of multivibrator 44 goes negative, and the multivibrator remains in the unstable condition according to the timing of the circuit 152–154. The time intervals are selected such that MOSFET 84 turns on low resistance power MOSFET 94 when contact 10B′ is about to close against contact 74 and circuit 152–154 retains the multivibrator 130 in the on condition until the possibility of contact bounce has concluded.

Referring again to FIG. 3, it is seen that the negative going transient 136 is effective in turning on multivibrator 44 as indicated at 44′ which maintains MOSFET 98 in an on condition as the relay contacts 10B, and 76 are opening. Then, after a transit period, multivibrator 130 is on for a period depicted at 130′ which maintains MOSFET 94 in an on condition until contacts 10B′ and 74 completely close.

The embodiment shown in FIGS. 2A and 2B is equally adapted to a double pole double throw relay, or for that matter a relay having a greater number of contacts. For the double pole, double throw version, the FIG. 2B portion of the circuit is repeated for the additional pole. Thus, as illustrated in FIG. 2A, additional light emitting portions 87 and 107 of additional opto couplers control other circuitry duplicatory of FIG. 2B.

In the circuitry illustrated in FIGS. 2A and 2B, the gate circuits of the various MOSFETs are isolated from one another by opto couplers. Also, the voltage applied to the collector of opto coupler receiver 86′ is suitably derived from one DC to DC converter while the voltage applied to the collector of opto coupler receiver 106′ is derived from another DC to DC converter, or at least from a separate power secondary on the same converter. One such power output is connected between leads 156 and 90, while a separate and isolated power output is connected between leads 158 and 102. Similarly, separate and isolated power sources are utilized for each of the power MOSFET gate circuits employed for a multipole, double throw relay or the like. In addition, another isolated power supply or DC to DC converter, preferably provided with a conventional voltage regulator, supplies the control circuit supply voltage Vdd in FIG. 2A.

Thus, the low resistance power MOSFETs, although comparatively small in size, are able to prevent arcing and/or metal deposition on relay contacts by essentially preventing any substantial voltage from appearing across those contacts during opening or closing thereof. The power MOSFETs conduct for short periods of time, typically on the order of milliseconds, whereby power dissipation is low although large currents pass therethrough.

Although the above-disclosed means for detecting a transient in a relay operating coil comprises a winding inductively related thereto, other means, such as a transformer connected across the operating coil, may alternatively be employed.

In some relay operating circuits a slowly rising control input is present which does not develop a sufficient transient in the relay coil to trigger operation of timing means of the embodiments of FIGS. 1 and 2. The relay contacts may also chatter. The embodiment illustrated in FIG. 4 overcomes these problems and provides an arcless relay which requires no independent power source.

Figure 4:
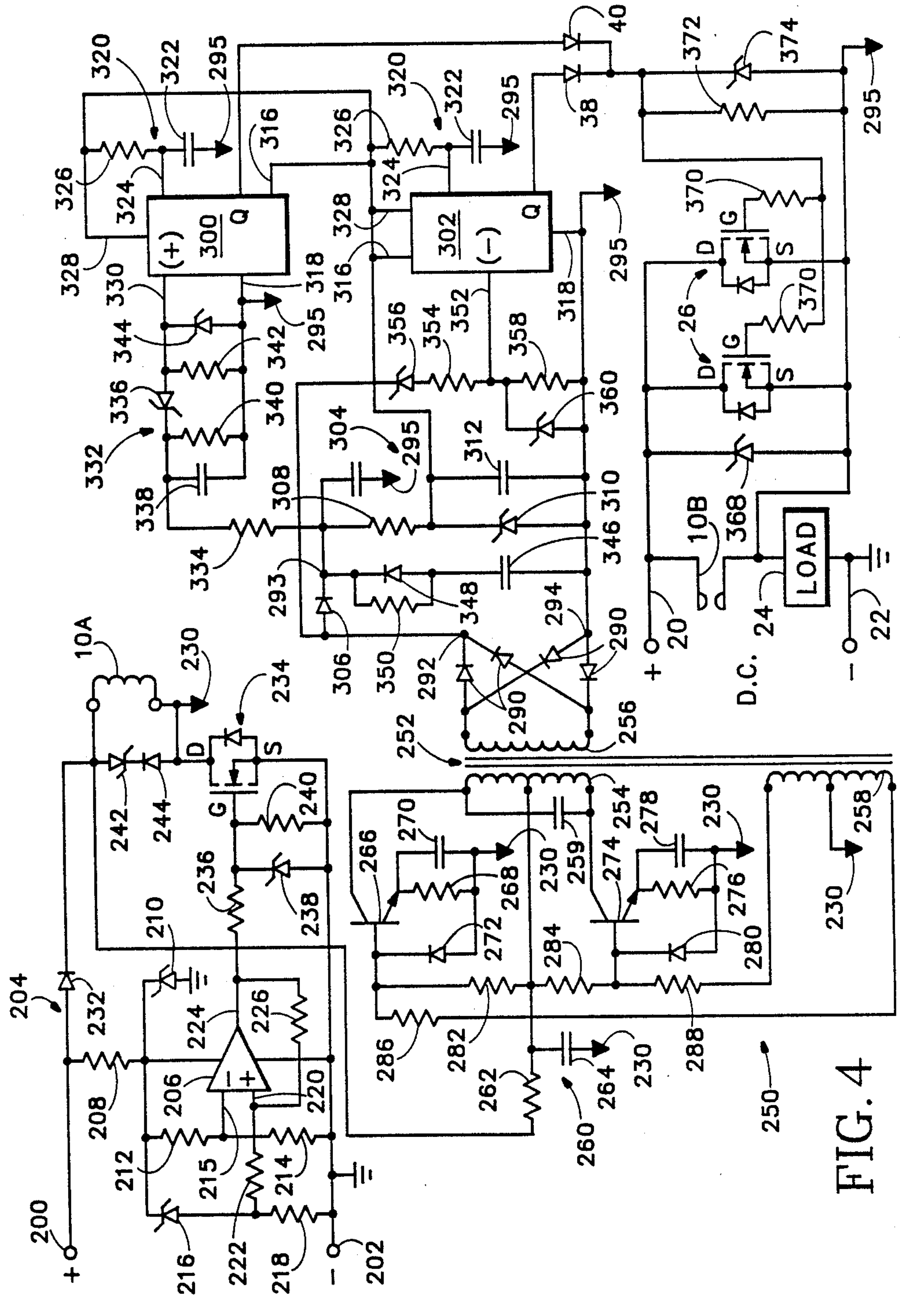

Referring to FIG. 4, a ramp-up circuit 204, operating as a Schmidt trigger, receives a control input intended to operate the relay at terminals 200 and 202, with terminal 202 representing a ground reference. Ramp-up circuit 204 includes differential amplifier 206 receiving a positive supply voltage from input terminal 200 through resistor 208. The interconnection of resistor 208 and amplifier 206 is returned to ground through zener diode 210 for limiting the maximum supply voltage applied to amplifier 206, and also through serially connected resistors 212 and 214. The interconnection of resistors 212 and 214 provides a reference voltage of approximately two-thirds of the control signal voltage for application to negative input terminal 215 of amplifier 206. The interconnection of resistor 208 and amplifier 206 is also returned to ground through serially coupled zener diode 216 and resistor 218, the junction of diode 216 and resistor 218 providing a sense voltage for tripping amplifier 206 at its positive input terminal 220 via resistor 222. Amplifier feedback resistor 226 cooperates with resistor 222 to establish a suitable hysteresis band for amplifier 206. As the control signal rises and the voltage applied to resistor 222 via diode 216 (dropping a constant voltage) becomes more positive than the voltage applied to negative input terminal 215, amplifier 206 generates an output or activation signal at terminal 224. On the other hand, the control signal must drop to a lower level before amplifier 206 is deactivated.

Operating coil 10A of the relay is interposed between a first reference voltage point 230 and input terminal 200 via diode 232 which limits EMI feed back to an external circuit. Serially connected diodes 242 and 244 couple the ends of coil 10A for shorting reverse transients. The interconnection of coil 10A and reference voltage 230 connects to a drain terminal (marked D) of MOSFET 234 while the source terminal (marked S) is returned to ground and input 202. The gate terminal (marked G) receives the output of amplifier 206 through resistor 236, and is coupled to ground via the parallel combination of diode 238 and resistor 240. Resistor 236 and diode 238 limit the voltage applied to the gate of MOSFET 234 while resistor 240 determines the gate to source impedance of MOSFET 234 to protect against false turn on. When amplifier 206 produces an output in response to a predetermined voltage level in the control signal, MOSFET 234 conducts and turns on operating coil 10A.

DC-to-DC converter 250 isolates the coil circuit from the load circuit while providing power for the arc suppression circuitry. The converter includes a core 252 with three windings, viz. a center tapped primary winding 254, a secondary winding 256 and a center tapped feedback winding 258 having its center tap connected to the aforementioned first reference voltage point 230. Capacitor 259 couples the ends of primary winding 254. Converter 250 takes its input from across coil 10A through an EMI filter 260 comprising a resistor 262, connecting coil 10A and the center tap of primary winding 254, and a capacitor 264 connecting said center tap to reference voltage 230. A transistor 266 has its collector tied to one end of primary winding 254 and its emitter coupled to reference voltage 230 through resistor 268 and capacitor 270 in parallel. The base of transistor 266 is returned to reference voltage 230 by way of diode 272. In similar fashion, a transistor 274 has its collector tied to the opposite end of winding 254 and its emitter coupled to reference voltage 230 through resistor 276 and capacitor 278 in parallel while its base is returned to reference voltage 230 by way of diode 280. Resistor 268 and capacitor 270 limit the saturation level of transistor 266 and resistor 276 and capacitor 278 serve the same function for transistor 274. Resistor 282 connects the center tap of winding 254 to the base of transistor 266 with resistor 284 connecting said center tap to the base of transistor 274. Resistor 286 is interposed between a first end of feedback winding 258 and the base of transistor 266 with resistor 288 similarly coupling the base of transistor 274 to a second end of feedback winding 258. Resistors 282 and 284 suitably bias transistors 266 and 274 as feedback winding 258 alternately saturates transistors 266 and 274 in an oscillation mode. Diodes 290 form a full wave bridge rectifier coupled to secondary winding 252 for providing an isolated DC output between positive terminal 292 and second reference voltage point 295 which is separate from point 230.

A filter circuit 304 is coupled to the output of the bridge circuit, comprising diodes 290, through a diode 306. Filter 304 includes resistor 308 and zener diode 310 connected in series between the cathode of diode 306 (terminal 293) and reference voltage 295. Capacitor 312 shunts the junction of diode 310 and resistor 308 to reference voltage 295 to complete the filter. Thus, the isolated DC output of converter 250 appears as a filtered DC voltage across capacitor 312.

The isolated DC output of converter 250 powers multivibrators 300 and 302. Each of multivibrators 300 and 302 includes a positive power lead 316 coupled to the interconnection of capacitor 312 and diode 310, and a negative power lead 318 connected to reference voltage point 295. When converter 250 is activated multivibrators 300 and 302 power-up. Multivibrators 300 and 302 each have a timing circuit 320 for determining the duration of the unstable state of the respective multivibrator. Timing circuits 320 each include a capacitor 322 coupling reference voltage 295 to a first timing circuit lead 324 and a resistor 326 coupling lead 324 to a second timing circuit lead 328. Each of leads 328 are empowered by a positive voltage at the junction of capacitor 312 and diode 310.

Activation of the DC-to-DC converter 250 triggers multivibrator 300 into substantially immediate operation. However, a positive trigger terminal 330 of multivibrator 300 is coupled to terminal 293 through delay circuitry 332 which permits multivibrator 300 to power-up before a positive going signal from terminal 293 reaches positive trigger terminal 330 for triggering the multivibrator. Delay circuitry 332 includes a resistor 334 and zener diode 336 connected in series. The anode of diode 336 connects to terminal 330. Capacitor 338 and resistor 340 in parallel couple the junction of diode 336 and resistor 334 to reference voltage 295. The parallel combination of resistor 342 and zener diode 344 return positive trigger terminal 330 to reference voltage 295. Multivibrator 300 operates immediately when a relay-operating input is provided at terminals 200, 202, and before the relay contacts close.

Multivibrator 302 operates when converter 250 is shut-down and requires a source of power following termination of the isolated DC output. To this end, capacitor 346 and diode 348, connected in series, couple the aforementioned terminal 293 and reference voltage 295, while resistor 350 is disposed in parallel with diode 348. Thus when DC-to-DC converter 250 is active capacitor 346 charges through resistor 350, but when converter 250 shuts down capacitor 346 discharges through diode 348 to provide power to multivibrator 302. Also, a negative going signal presented at multivibrator negative trigger terminal 352 immediately activates multivibrator 302. Terminal 352 is connected to the anode of diode 306 through resistor 354 in series with diode 356, terminal 352 being returned to reference voltage point 295 through resistor 358 in parallel with diode 360. Diode 306 serves to decouple converter 250 from the filter 304 and capacitor 346 so that a fast negative going transient is available at the anode of diode 306 to trigger multivibrator 302 when the input between terminals 200 and 202 is interrupted.

As in the previous embodiments, operating coil 10A controls contacts 10B to complete a circuit between a source of DC power, applied between lines 20 and 22, and load 24. Line 22 is common with the ground reference of terminal 202. Zener diode 368 absorbs transients appearing across contacts 10B for protecting MOSFETs 26, which desirably have the same low voltage drop characteristic as in the previous embodiments. MOSFETs 26 are disposed in shunt relation with relay contacts 10B, the MOSFETs having their source terminals tied to reference voltage point 295 as well as to one of contacts 10B while their drain terminals connect to another of the relay contacts. Each MOSFET 26 gate terminal is coupled through a resistor 370 to cathodes of diodes 38 and 40 which receive the Q output of multivibrator 302 and the Q output of multivibrator 300 respectively. The cathodes of diodes 38 and 40 are returned to reference voltage point 295 through resistor 372 in parallel with zener diode 374.

In operation, the control signal may rise very slowly, but at a predetermined voltage, amplifier 206 energizes converter 250 and coil 10A simultaneously through MOSFET 234 to trigger the relay into operation. The hysteresis of ramp-up circuit 204 prevents small changes in the control signal from causing chattering of contacts 10B and insures proper switching of MOSFETs 26. Converter 250 is immediately functional in order to be effective in turning on multivibrator 300 and MOSFETs 26 before contacts 10B close. The output voltage of converter 250 triggers multivibrator 300 immediately after multivibrator has powered up and multivibrator 300 turns on MOSFETs 26 prior to closing of contacts 10B so as to shunt current around the contacts. A short time thereafter, multivibrator 300 returns to its stable state and MOSFETs 26 turn off such that contacts 10B carry the full current of load 24. Subsequently, when the control signal is turned off or falls below the hysteresis band of amplifier 206, converter 250 shuts off whereby coil 10A is deenergized. Multivibrator 302 detects the termination of the isolated DC output via zener diode 356 and fires to again turn MOSFETs 26 on prior to the opening of contacts 10B. As contacts 10B open, MOSFETs 26 carry the current of load 24 until multivibrator 302 returns to its stable state at which time MOSFETs 26 turn off with the load circuit open.

The arcless relay shown in FIG. 4 is configured for "hot-side switching", i.e. contacts 10B are interposed between the positive lead of the D.C. power source and load 24 whereby the negative lead of the D.C. power source desirably forms a ground reference for the load 24. In this configuration reference voltage point 295 was isolated from ground potential via the D.C. to D.C. converter 250 so as to prevent placing contacts 10B and MOSFETS 26 across the D.C. power source. Although "hot-side switching" is frequently utilized, the present invention may be applied to an arcless relay configured for "cold-side switching" wherein the source terminals of MOSFETS 26 and one of contacts 10B may be connected to ground potential.

Figure 5:
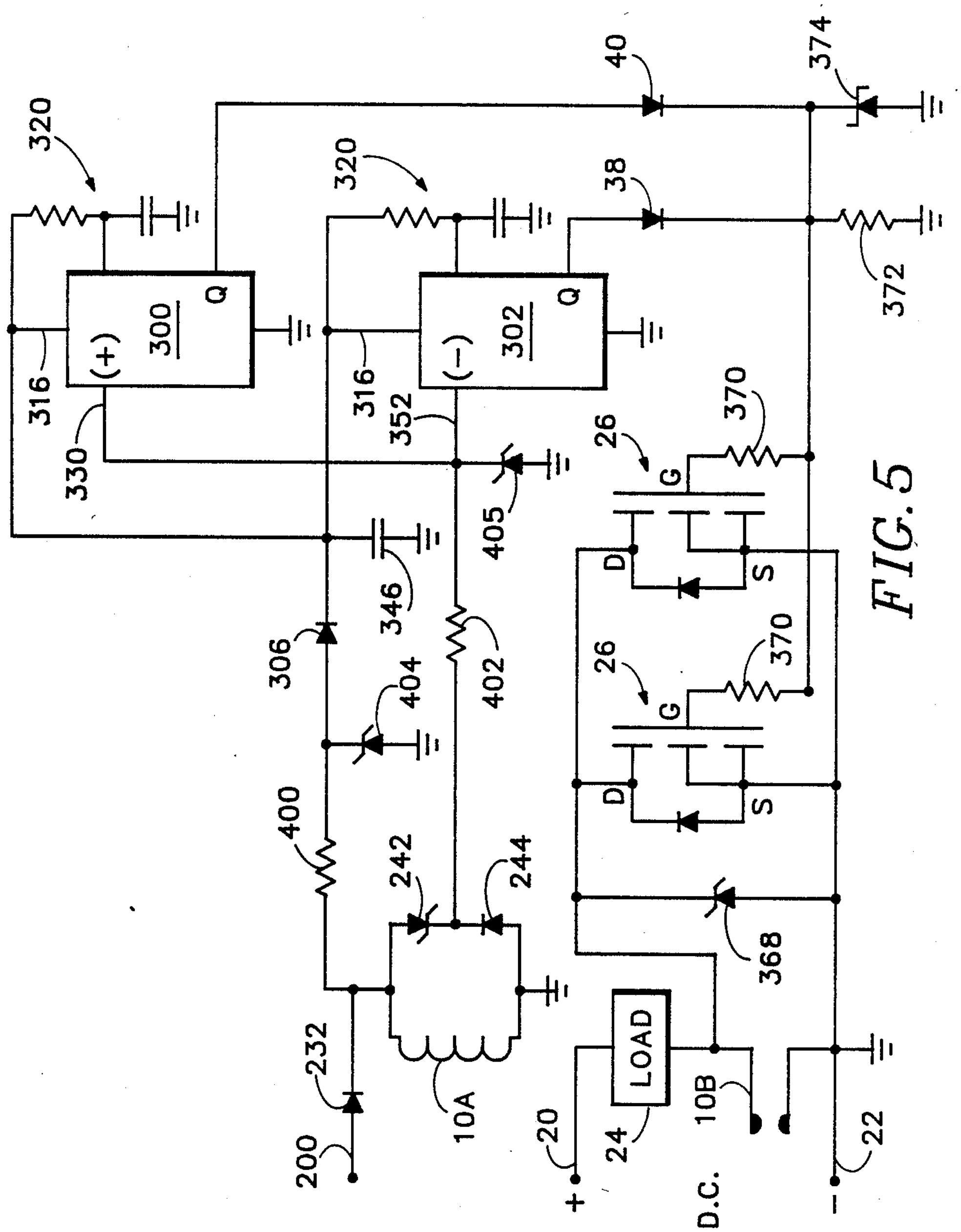

FIG. 5 illustrates a low cost arcless relay circuit configured for cold-side switching, this circuit retaining the advantage of requiring no external power supply for the arc suppression control. When cold-side switching is thus employed, the arcless relay may be simplified. With this approach, the positive lead of load 24 is tied to the positive line 20 of the D.C. power source and the negative lead of load 24 couples through relay contacts 10B to negative line 22, i.e., D.C. power source ground potential. In this configuration, there is no need to isolate the source terminals (marked S) of MOSFETS 26 from ground. Accordingly, the source terminals of MOSFETS 26 connect to line 22, and the drain terminals (marked D) connect to the junction between contacts 10B and the load. It is understood that while the circuit of FIG. 5 employs two MOSFETS 26 connected in parallel relation, only one MOSFET may be employed or additional MOSFETS may be added in parallel for applications where greater current must be shunted around the relay contacts. Zener diode 368 couples the source and drain terminals of MOSFETS 26 to protect MOSFETS 26 from transients.

Operating coil 10A is connected at one end to ground potential and is driven at the other end via diode 232 by a control signal between terminal 200 and ground. A ramp-up circuit similar to circuit 204 of FIG. 4 may be inserted to process the control signal appearing at terminal 200 as described previously, but is omitted in this embodiment for economy reasons. Zener diode 242 and diode 244 are connected as shown at their cathodes, while their anodes are coupled respectively to terminals of coil 10A to provide coil transient suppression, and, as explained more fully hereinafter, to provide triggering voltage for operating multivibrators 300 and 302.

Multivibrators 300 and 302 operate as in the circuit of FIG. 4 to turn MOSFETS 26 on when contacts 10B open or close. Multivibrators 300 and 2 are powered at their positive power leads 316 from the control signal appearing at terminal 200 via serially coupled resistor 400 and diode 306, the cathode of diode 306 being connected to the leads 316. Zener diode 404 returns the interconnection of resistor 400 and diode 306 to ground for establishing a suitable supply voltage level for the multivibrators. A capacitor 346 is interposed between the cathode of diode 306 and ground and charges when the positive control signal is present for maintaining a source of power for multivibrator 302 when the control signal concludes. The power to operate the arc suppression circuitry is thus obtained from the control input as in the previous embodiment. Multivibrators 300 and 302 each employ a timing circuit 320 similar to those illustrated in FIG. 4 for determining multivibrator on-time. The interconnection of diodes 242 and 244 is coupled to trigger inputs 330 and 352 of multivibrators 300 and 302 through resistor 402, while zener diode 405 returns the trigger inputs to ground.

Gate terminals (marked G) of MOSFETS 26 are driven by the Q outputs of multivibrators 300 and 302 in a manner similar to that described in connection with the embodiment of FIG. 4. Diodes 38 and 40 respectively connect Q outputs of multivibrators 302 and 300 to the gates (marked G) of MOSFETS 26 via resistors 270 such that when either of multivibrators 300 and 302 produces a Q output pulse, MOSFETS 26 turn on and shunt current around contacts 10B. The cathodes of diodes 38 and 40 are returned to ground through the parallel combination of resistor 372 and zener diode 374.

In operation, the arcless relay of FIG. 5 is activated when the control signal present at terminal 200 is asserted, i.e., goes positive, and operating coil 10A begins to close contacts 10B. Before contacts 10B close, however, multivibrators 300 and 302 are powered into operation with capacitor 346 concurrently charging. Trigger circuit 330 sees a positive going triggering pulse generated at the cathodes of diodes 244 and delivered there by way of resistor 402. The Q output of multivibrator 300 goes high to turn MOSFETS 26 on prior to the closure of contacts 10B, thereby momentarily shunting current around contacts 10B. After contacts 10B close and cease bouncing, the Q output of multivibrator 300 goes low and turns MOSFETS 26 off to permit contacts 10B to carry the current of load 24. When the control signal is later de-asserted, e.g. returns to ground potential, contacts 10B would begin to open. At this time capacitor 346 is charged and provides a source of power for multivibrator 302 while diode 306 prevents capacitor 346 from discharging through coil 10A. Before contacts 10B open, the back EMF of coil 10A produces a negative going trigger at the cathodes of diodes 242 and 244. The back EMF of coil 10A provides a reverse bias on zener diode 242 which reaches the breakdown voltage of diode 242, as the cathode voltage of diodes 242 and 244 is rapidly driven in a negative direction. Diode 244 prevents this negative excursion from exceeding approximately one volt below ground potential. Multivibrator 302, which remains powered, produces its Q output to turn MOSFETS 26 on and shunt current around contacts 10B. When contacts 10B are sufficiently separated, the Q output of multivibrator 302 goes low, thereby returning MOSFETS 26 to a substantially nonconductive state and isolating load 24 from the negative line 22 of the D.C. power supply.

The circuit of FIG. 5 is advantageously employed in a fairly low voltage D.C. environment where both power to the load (between line 20 and ground) and the control input (between terminal 200 and ground) are obtained from the same low voltage source such as a 12 to 48 volt battery supply. In such instance a control switch or the like is interposed between the positive battery terminal and control terminal 200 which, upon actuation, initiates relay operation.

While several embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A contact protective circuit for a relay including a pair of contacts and an operating coil for changing the circuit-completing status of said contacts between an open circuit and a closed circuit condition, comprising:

means for detecting a transient in said operating coil pursuant to a change in the energization of said operating coil prior to the resulting change in circuit-completing status of said contacts, a field effect transistor having a drain terminal, a source terminal and a gate terminal, means connecting said drain terminal and said source terminal respectively to contacts of said pair, and timing means responsive to said detecting means and coupled to said gate terminal of said field effect transistor for gating said field effect transistor to an on condition, shunting current around said contacts, starting at least as soon as the beginning of said change in circuit-completing status of said contacts.

2. The circuit according to claim 1 wherein said timing means comprises a monostable multivibrator operated in response to said detection by said detecting means.

3. The circuit according to claim 2 wherein said timing means comprises an additional monostable multivibrator operated from the output of said first mentioned monostable multivibrator, said additional monostable multivibrator determining the duration of the on condition of said field effect transistor.

4. The circuit according to claim 1 wherein said timing means comprises a first pulse forming circuit responsive to a detected transient of a first polarity for gating said field effect transistor to an on condition, and a second pulse forming circuit responsive to a detected transient of a second polarity for gating said field effect transistor to an on condition during the reverse change in the status of said contacts.

5. The circuit according to claim 4 wherein each of said pulse forming circuits comprises a monostable multivibrator.

6. The circuit according to claim 1 wherein said transient detecting means comprises a winding inductively related to said operating coil for changing the circuit-completing status of said contacts.

7. The circuit according to claim 1 wherein said relay is provided with at least one additional contact adapted to cooperate with at least one additional contact adapted to cooperate with one of said pair of contacts to make when said pair breaks and vice versa, said circuit further including:

a second field effect transistor having a drain terminal, a source terminal and a gate terminal, means connecting one of said drain and source terminals of said second field effect transistor to said additional contact and the other of said drain and source terminals of said second transistor to the said one of said pair of contacts with which said additional contact is adapted to cooperate, and second timing means responsive to said detecting means and coupled to said gate terminal of said second field effect transistor for gating said second field effect transistor to an on condition for shunting current around the last two mentioned contacts, starting at least as soon as the beginning of the change in the circuit-completing status thereof.

8. The circuit according to claim 7 wherein said second timing means comprises a monostable multivibrator operated in response to detection of a second transient by said detecting means.

9. The circuit according to claim 7 wherein the first mentioned timing means includes first and second cascaded monostable multivibrators and wherein the second timing means includes third and fourth cascaded monostable multivibrators, the first mentioned field effect transistor being responsive in its operation to the outputs of said first and fourth monostable multivibrators, and the second field effect transistor being responsive in its operation to the outputs of said second and third monostable multivibrators.

10. A contact protective circuit comprising:

a pair of contacts, means for detecting an expected change in the circuit-completing status of said contacts, a metal oxide semiconductor field effect transistor having a drain terminal, a source terminal and a gate terminal, said field effect transistor having an Rds On resistance of less than 0.5 volts divided by the DC current expected to flow between said contacts in the closed condition, means connecting said drain terminal and said source terminal respectively to the contacts of said pair, and timing means responsive to said detecting means and coupled to said gate terminal of said field effect transistor for gating said field effect transistor to an on condition during the entire period during which said change in the circuit-completing status of said contacts takes place such that substantially no arcing or metal deposition occurs.

11. The circuit according to claim 10 wherein said pair of contacts comprises contacts of a relay provided with an operating coil, and wherein said detecting means comprises a winding inductively related to said operating coil.

12. The circuit according to claim 10 wherein said pair of contacts comprises contacts of a relay provided with an operating coil, and wherein said detecting means includes a transformer interconnected with said operating coil.

13. The circuit according to claim 10 wherein said timing means comprises a monostable multivibrator operated from its stable state to its unstable state in response to said detection by said detecting means, the duration of said unstable state of said monostable multivibrator spanning said change in the circuit-completing status of said contacts.

14. The circuit according to claim 10 wherein said timing means comprises a pair of cascaded monostable multivibrators, the duration of the output of the second of said multivibrators spanning said change in the circuit-completing status of said contacts.

15. The circuit according to claim 10 wherein said timing means comprises a first pulse forming circuit responsive to a detected transient of a first polarity for gating said field effect transistor to an on condition, and a second pulse forming circuit responsive to a detected transient of a second polarity for gating said field effect transistor to an on condition during the reverse change in the status of said contacts.

16. The circuit according to claim 15 wherein each of said pulse forming circuits comprises a monostable multivibrator.

17. A relay responsive to a control signal, the relay comprising:

a pair of contacts;

a field effect transistor having a drain terminal, a source terminal, and a gate terminal, said field effect transistor having an Rds On resistance of less than 0.5 volts divided by the DC current expected to flow between said contacts in closed condition;

means connecting said drain terminal and said source terminal respectively to contacts of said pair;

means for generating an activation signal in response to a given threshold level in the control signal, said last mentioned means having a hysteresis characteristic such that said activation signal is generated when said control signal increases to said threshold level and continues to be generated until said control signal drops to a second level lower than said threshold level;

an operating coil responsive to the activation signal for changing the circuit completing status of said contacts between an open circuit condition and a closed circuit condition; and means responsive to said activation signal and coupled to the gate terminal of said field effect transistor for gating said field effect transistor to an on condition, shunting current around said contacts, starting at least as soon as the beginning of a change in the circuit completing status of said contacts.

18. A contact protective circuit according to claim 17 wherein said means for generating an activation signal comprises a Schmidt trigger circuit having an output for driving said operating coil.

19. A relay responsive to a control signal, said relay comprising:

a pair of contacts;

a field effect transistor having a drain terminal, a source terminal, and a gate terminal;

means connecting said drain terminal and said source terminal respectively to contacts of said pair;

means for generating an activation signal at a time when the control signal exceeds a given threshold;

an operating coil responsive to the activation signal for changing the circuit completing status of said contacts between an open circuit condition and a closed circuit condition;

a DC to DC converter powered by the control signal and supplying a source of DC power; and timing means powered by the source of DC power and triggerably responsive to the output of the DC power source, said timing means being coupled to the gate terminal of said field effect transistor for gating said field effect transistor to an on condition and shunting current around said contacts, starting at least as soon as the beginning of a change in the circuit completing status of said contacts.

20. A contact protective circuit according to claim 19 further comprising delay means coupling said DC power source and said timing means for allowing for said timing means to power up before triggerably responding to the inception of output from the DC power source.

21. A relay responsive to a control signal, said relay comprising:

a first contact;

a second contact;

means responsive to said control signal for opening and closing said first and second contacts;

means for shunting current around said contacts at times when said contacts are opening and closing, said shunting means requiring a source of power and having a power lead suitable for coupling to a power source; and means coupling said control signal and said power lead for deriving a power source for said shunting means from said control signal.

22. A relay according to claim 21 wherein said shunting means comprises a field effect transistor in shunting relation to said contacts and multivibrator timing means for turning said field effect transistor on when said contacts open and close, said multivibrator timing means being powered by said control signal via said coupling means.

23. A relay according to claim 21 wherein said contacts are closed when said control signal is at a first voltage level and opened when said control signal is at a second voltage level, and wherein said shunting means comprises a field effect transistor in shunting relation to said contacts and multivibrator timing means for turning said field effect transistor on when said contacts open and close; and wherein said coupling means comprises means coupled to said control signal for storage of energy when said control signal is at said first voltage level and for delivery of energy stored therein to said power lead when said control signal is at said second voltage level.

24. A relay according to claim 23 wherein said storage and delivery means comprises a capacitor.

25. A relay responsive to a control signal, said relay comprising:

a first contact;

a second contact;

an operating coil having a first terminal and a second terminal, said coil being responsive to said control signal for opening and closing said contacts;

means responsive to a trigger input for shunting current around said contacts;

a first diode having a first terminal and a second terminal, the first terminal of said first diode being connected to the first terminal of said coil;

a second diode having a first terminal and a second terminal, the first terminal of said diode being connected to the second terminal of said coil, the second terminal of said second diode being connected to the second terminal of said first diode to form a trigger voltage terminal; and means coupling the trigger voltage terminal and the trigger input of said shunting means.

26. A relay according to claim 25 wherein said shunting means is responsive to a positive going voltage and a negative going voltage at its trigger input, wherein said control signal is applied to the first terminal of said coil and the second terminal of said coil is coupled to a reference voltage, and the first terminal of each of said diodes comprises an anode and the second terminal of each of said diodes comprises a cathode.

27. A relay according to claim 26 wherein said first diode is a zener diode.

28. A contact protective circuit for a relay responsive to a control signal and including a pair of contacts and an operating coil for changing the circuit-completing status of the contacts between an open circuit and a closed circuit condition, the contact protective circuit comprising:

means coupling the contacts and responsive to a shunt signal for shunting current around the contacts; and means for driving the operating coil and generating said shunt signal in response to said control signal reaching a given threshold level;

said driving means comprising a Schmidt trigger for receiving the control signal and having an output responsive to a given voltage level of the control signal, the output being suitable for driving said operating coil; a DC-to-DC converter powered by the control signal and providing an isolated DC output when powered; and timing means responsive to the isolated DC output and coupled to said shunting means for bringing about the shunting of current around said contacts in response to the inception and termination of the isolated DC output.

29. A contact protective circuit according to claim 28 wherein said isolated DC output also powers said timing means.

* * * * *